(12) United States Patent
Rao et al.

(10) Patent No.: US 11,863,616 B1
(45) Date of Patent: Jan. 2, 2024

(54) SELECTING HOSTING SERVERS FOR NETWORK SERVICES

(71) Applicant: Amazon Technologies, Inc., Seattle, WA (US)

(72) Inventors: Siddhartha Shankara Rao, Seattle, WA (US); John Joseph Dunne, Bremertom, WA (US); Tobias DiPasquale, King of Prussia, PA (US); Jade Yuk Yin Chan, San Francisco, CA (US); Alex Snyatkov, Newton, MA (US)

(73) Assignee: Amazon Technologies, Inc., Seattle, WA (US)

( * ) Notice: Subject to any disclaimer, the term of this patent is extended or adjusted under 35 U.S.C. 154(b) by 140 days.

(21) Appl. No.: 17/085,919

(22) Filed: Oct. 30, 2020

(51) Int. Cl.
*H04L 67/1021* (2022.01)
*H04L 67/101* (2022.01)
*H04L 67/52* (2022.01)

(52) U.S. Cl.
CPC ........ *H04L 67/1021* (2013.01); *H04L 67/101* (2013.01); *H04L 67/52* (2022.05)

(58) Field of Classification Search
CPC ... H04L 67/1021; H04L 67/101; H04L 67/52; H04L 65/80; H04L 65/406; H04L 43/0841; H04L 67/1023
See application file for complete search history.

(56) References Cited

U.S. PATENT DOCUMENTS

| | | |
|---|---|---|
| 6,795,858 B1 | 9/2004 | Jain et al. |
| 6,898,633 B1 | 5/2005 | Lyndersay et al. |
| 7,039,709 B1 | 5/2006 | Beadle et al. |
| 7,051,098 B2 * | 5/2006 | Masters ............... H04L 43/0811 709/224 |
| 9,167,011 B2 * | 10/2015 | Ellison ................. H04L 65/1069 |
| 9,516,076 B2 * | 12/2016 | Ellison .................... H04L 47/15 |
| 10,091,281 B1 | 10/2018 | Lockhart |
| 2004/0039820 A1 | 2/2004 | Colby et al. |
| 2004/0083307 A1 * | 4/2004 | Uysal ...................... H04L 67/51 709/246 |
| 2005/0108328 A1 | 5/2005 | Berkeland et al. |

(Continued)

FOREIGN PATENT DOCUMENTS

WO    WO-2009073832 A1 *   6/2009    ........... H04L 67/322

OTHER PUBLICATIONS

U.S. Appl. No. 16/586,700; Non-Final Office Action; dated Aug. 21, 2020; 33 pages.

(Continued)

*Primary Examiner* — Benjamin M Thieu
(74) *Attorney, Agent, or Firm* — BakerHostetler

(57) ABSTRACT

Implementations for selecting hosting server(s) in a particular availability zone for a network service involving a plurality of participants is described. A request for a network service involving a plurality of nodes is received from a computing device associated with an organizer. Geographic locations of the plurality of nodes involved in the network service, the type of the network service, performance of a plurality of servers, and operational constraints of the plurality of servers are evaluated. At least two of the plurality of servers are located in different geographical locations. One or more of the plurality of servers to host the network service are selected based on the evaluation.

20 Claims, 10 Drawing Sheets

(56) References Cited

U.S. PATENT DOCUMENTS

| | | | |
|---|---|---|---|
| 2005/0180319 A1* | 8/2005 | Hutnik | H04L 67/1021 |
| | | | 370/237 |
| 2008/0062997 A1 | 3/2008 | Nix | |
| 2009/0276771 A1* | 11/2009 | Nickolov | H04L 67/1008 |
| | | | 718/1 |
| 2012/0066302 A1 | 3/2012 | Petersen et al. | |
| 2012/0106333 A1 | 5/2012 | Lee et al. | |
| 2014/0115139 A1* | 4/2014 | Bradley | H04L 67/52 |
| | | | 709/223 |
| 2015/0381708 A1* | 12/2015 | Word | H04L 67/01 |
| | | | 709/203 |
| 2016/0105641 A1* | 4/2016 | Periyannan | H04L 12/18 |
| | | | 348/14.08 |
| 2017/0054784 A1* | 2/2017 | Panattu | H04L 43/0829 |
| 2017/0264449 A1 | 9/2017 | Seetharaman et al. | |
| 2017/0295077 A1* | 10/2017 | Dyszynski | H04L 67/52 |
| 2018/0361235 A1* | 12/2018 | Hunter | H04L 67/1021 |
| 2019/0158546 A1 | 5/2019 | Page et al. | |
| 2019/0191005 A1* | 6/2019 | Gallardo | H04L 67/63 |

OTHER PUBLICATIONS

U.S. Appl. No. 16/586,700; Final Office Action; dated Mar. 29, 2021; 37 pages.

U.S. Appl. No. 16/586,700; Non-Final Office Action; dated Aug. 23, 2021; 41 pages.

U.S. Appl. No. 16/586,700; Final Office Action; dated Jan. 25, 2022; 34 pages.

U.S. Appl. No. 16/586,700; Non-Final Office Action; dated May 20, 2022; 35 pages.

* cited by examiner

SELECTING HOSTING SERVERS FOR NETWORK SERVICES

BACKGROUND

Service providers offer cloud-based services via service provider networks to fulfill user's computing-service needs without the users having to invest in and maintain computing infrastructure required to implement the services. These service providers may provide network-based computing resources and functionality to implement various types of cloud-based services, such as, for example, scalable-storage services, computer-processing services, conference services, and so forth. In some examples, developers may utilize services offered by the service provider to run the applications using virtual services (or "instances") provisioned on various configurations of hardware-based resources of a cloud-based service.

The services may be provided on a hosting server(s) that may be part of a service provider network. The participants in the services generally communicate with the hosting servers using electronic devices such as, for example, smart phones, tablets, computers, etc. User experience with such services can vary for the various participants based upon the location of the participants. Often, the user experience can vary based upon proximity of participants to the hosting servers. For example, the farther away a participant is from the hosting servers, the worse the user experience may be. Often, this is due to latency issues with regard to data communicated between the participants via the hosting servers.

For example, if a participant is located on the West Coast of the United States and another participant is located in Europe, if the hosting servers are located on the West Coast of the United States, then latency issues for the meeting participant in Europe may be great while latency issues for the participant on the West Coast may be minimal or even non-existent. Thus, due to the increased latency for the participant in Europe, the two participants may notice a lag in communication by the participant in Europe. In known networks, the location of the media conference organizer generally determines the location of the hosting servers. Thus, in this example, since the hosting servers are located on the West Coast, the meeting was likely organized by the meeting participant on the West Coast.

BRIEF DESCRIPTION OF THE DRAWINGS

The detailed description is set forth below with reference to the accompanying figures. The use of the same reference numbers in different figures indicates similar or identical items.

The systems depicted in the accompanying figures are not to scale and components within the figures may be depicted not to scale with each other.

DETAILED DESCRIPTION

Figure 1:
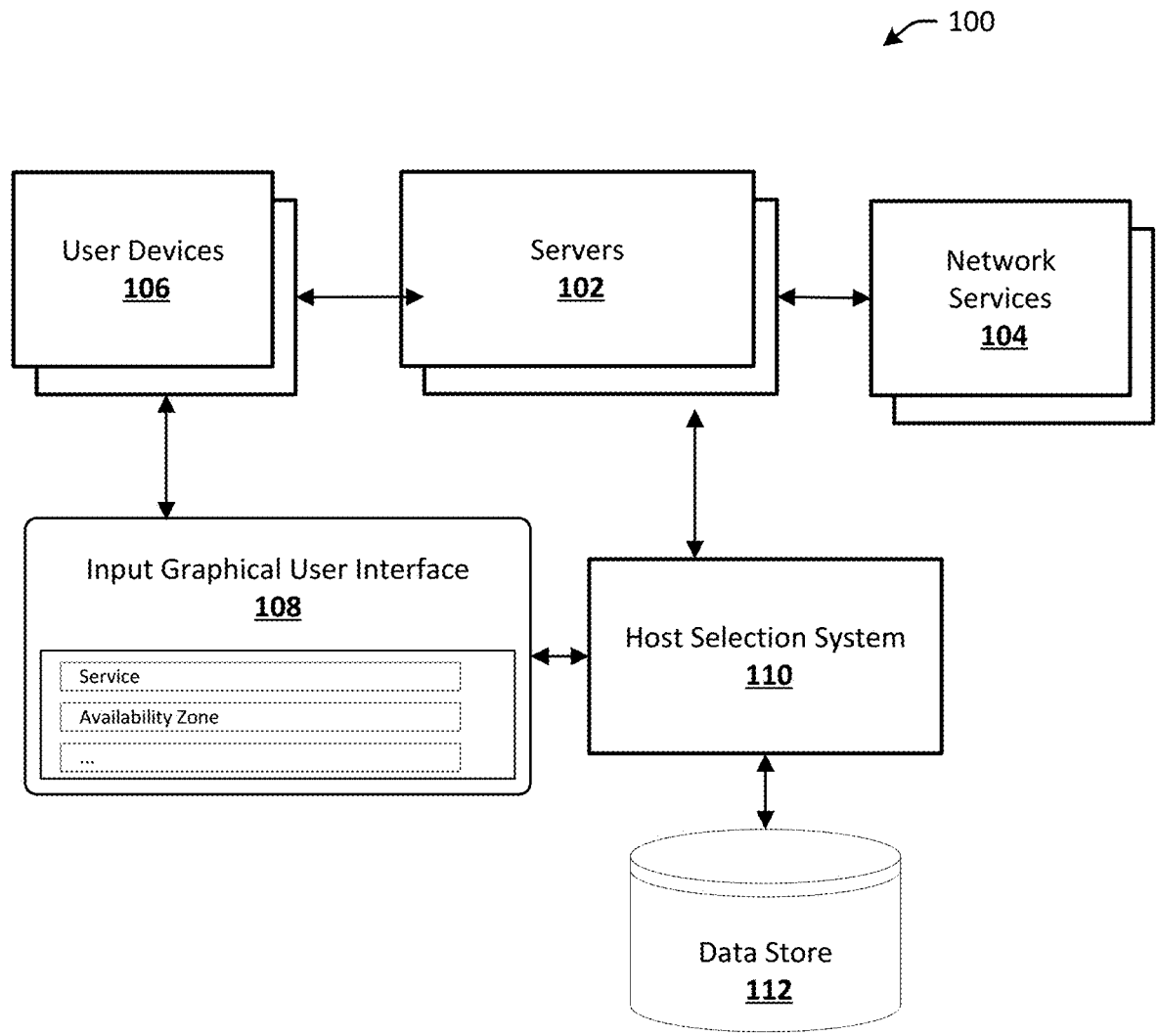
FIG. 1 schematically illustrates a high-level architecture of a network service system in a service provide network.

This disclosure describes techniques and architecture for evaluating and selecting hosting servers for a network service, e.g., media conferencing, file hosting, interactive electronic gaming, etc., where participants for the network service are located in multiple geographic locations. A plurality of hosting servers may be located in various geographical locations. An organizer can select a network service and parameters of the network service using a graphical user interface ("GUI"). A network service provider will then evaluate the geographic locations of the participants in the network service, performance metrics, such as latency, operational constraints, and the selected user parameters to select the hosting server for the network service. The one or more hosting servers at a geographic location or availability zone will provide acceptable user experiences for all participants.

In particular, for each request for a network service, the participant regions may be determined. For each region capable of hosting the network service, e.g., each host region having one or more hosting servers, a "score" may be determined for that host region. In configurations, the scores for the host regions may be based on Round-Trip Time (RTT) Tier of Service, latency between participants, a combination of both, operational constraints, and user preferences. The host region having the best (or highest) score may be selected to host the network service.

In some instances, the operational constraints and user preferences may limit the selection of hosting server(s) based upon only RTT and/or latency. For example, if an hosting server is located in a region through which the participants do not wish to have the meeting routed, then a different geographic location may be selected that is acceptable to the participants and that also provides an acceptable user experience for the participants. Other considerations may include company policies, laws, regulations, etc., that may affect where hosting servers may be geographically located. Additionally, other operational constraints such as traffic on networks, available capacity of the network services, available capacity of the hosting servers, communication pipeline availability, functionality, etc., may also affect where hosting servers may be geographically located.

The hosting server(s) can be selected based on heuristics applied to the geographical regions of the participants and the parameters provided by the organizer. The heuristics can be programmed into the host selection component of the service provider network. In some embodiments, the hosting server(s) can be selected by a machine learning model that is trained with prior performance metrics, operational constraints, and user preferences of completed network services.

Certain implementations and embodiments of the disclosure are described more fully below with reference to the accompanying figures, in which various aspects are shown. However, the various aspects may be implemented in many different forms and should not be construed as limited to the specific implementations described herein. The disclosure encompasses variations of the described embodiments.

FIG. 1 illustrates a high-level architecture 100 of a network service system in a service provide network, according to an embodiment. One or more servers 102 may serve as a frontend to one or more network services 104 for various user devices 106. The network services can be, for example, Virtual Machine (VM) instances, file hosting, cloud computing, project platform, document platform, audio conferencing, video conferencing, chatting, gaming services, etc. Note that, while network services 104 are shown outside servers 102 in FIG. 1, one or more of network services 104 may be implemented on one or more of the servers 102.

A host selection system 110 may evaluate performance metrics related to potential hosting servers 102 in various geographical locations with respect to the user devices 106 that intend to participate in the network service, as well as operational constraints and user preferences. For example, the performance metrics may include latency with regard to transmission of audio data packets, video data packets, and content data packets, e.g., audio quality, video quality, and content quality, between user devices 106. The type of network service, operational constraints, and user preferences may be received from the users of the user devices 106 via an input GUI 108, which is described further in connection with FIG. 7.

The performance metrics, operational constraints, and user preferences may be stored in one or more databases stored on one or more data storage devices and/or data storage systems 112. In an embodiment, the performance metrics, operational constraints, and user preferences may be partitioned into three or more partitions in the datastore 112 by the host selection system 110. For example, the performance metrics may be stored in one partition, the operational constraints may be stored in another partition, and the user preferences may be stored in a third partition. Each partition may include one or more systems or servers that each implement one or more instances of components of the host selection system 110 that support that particular partition. Note that, in embodiments, the servers, partitions, and/or data storage devices or systems may be distributed across two or more data centers. In an embodiment, host selection system 110 may provide an add metric operation via an add metric interface to add performance metrics to the datastore 112, and a get metric operation via a get metric interface, or query interface, to get performance metrics information from the datastore 112.

In an embodiment, components of host selection system 110 may be implemented on one or more backend servers in the context of the Web services framework. Note, however, that one or more components of host selection system 110 may be implemented on one or more of the frontend servers 102. However, one or more backend servers that each implement one or more instances of one or more components of the host selection system 110 may be considered frontend servers of the host selection system 110 itself, while one or more instances of one or more other components of the host selection system 110 may be implemented on backend servers in the context of the host selection system 110.

In an embodiment, the host selection system 110 may be exposed as a Web service via a Web service interface that other entities may leverage to perform Host selection services, applications, etc. An entity may implement functionality that intercepts calls to a service, such as the network services 104, or other applications that are being hosted. The entity may then make calls through the Web service interface to the host selection system 110 to add performance metrics information to and get performance metrics from the datastore 112. For example the host selection system 110 maybe part of an application programming interface (API) that defines interactions between multiple software intermediaries. In an implementation, the host selection system 110 can be part of a software development kit (SDK), which can be implemented into a software development tool of a network service.

Embodiments of the host selection system 110 as described herein may be implemented according to an architecture that is linearly scalable. Embodiments may be scaled quickly and easily with little or no risk of losing usage information, with minimum or no downtime, and without affecting the latency of the overall system. Servers 102 may be added as needed to support the host selection system 110.

Figure 2:
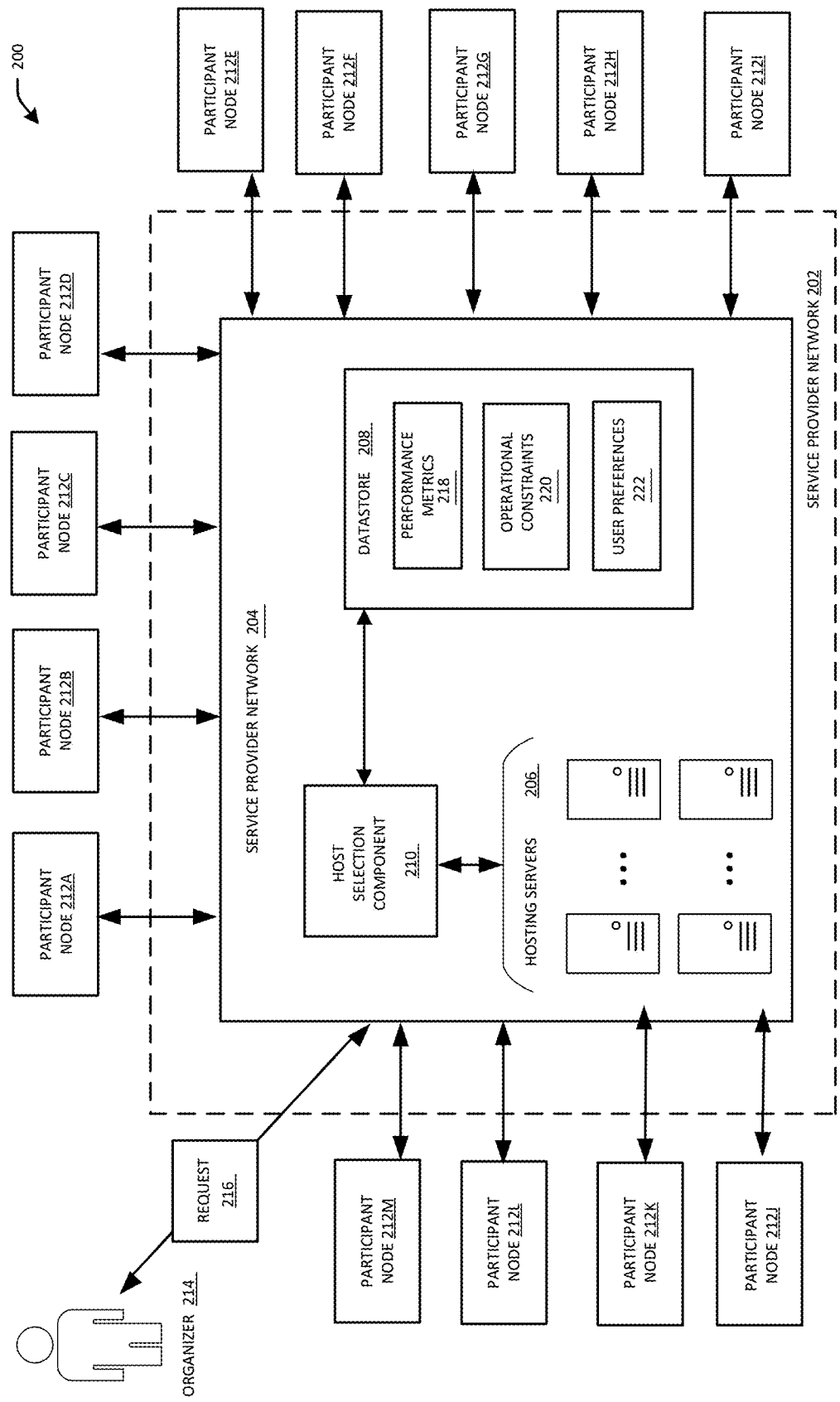
FIG. 2 schematically illustrates a system-architecture diagram of an example service provider network that provides a network service.

FIG. 2 schematically illustrates an example environment 200 that includes a service provider network 202. The service provider network 202 provides various services to users, such as participant nodes 212A-M, which can be the user devices 106. For example, the service provider network 202 can provide computing resources, like Virtual Machine (VM) instances and storage, on a permanent or an as-needed basis. In particular, the computing resources provided by the service provider network 202 can include various types of computing resources, such as data processing resources like VM instances, data storage resources, networking resources, data communication resources, and the like. Common expressions associated with the service provider network may include, for example, "on-demand computing," "software as a service (SaaS)," "cloud services," "data centers," and so forth. Services provided by the service provider network 202 may be distributed across one or more physical or virtual devices.

In the example environment 200, the service provider network 202 includes a service provider network 204. The service provider network 204 may include multiple hosting servers 206. In some embodiments, the multiple hosting servers 206 may be the frontend servers 102 and located in multiple geographical locations. In some embodiments, the service provider network 204 also includes a data store 208 and a host selection component 210. In some embodiments, the host selection component 210 may be the host selection system 110. The service provider network 204 may facilitate initiation of the network service or may otherwise allow the network to take place via hosting server (or servers) 206.

Multiple participant nodes 212A-M are illustrated in the example environment 200. The participant nodes 212A-M represent participants, user devices, clients, and/or users for network services provided by the service provider network 204. The network service may be, for example, the communications services, including text, audio, video, and data conferencing services. The data conferencing service can include, for example, screen sharing and file hosting services. The participant nodes 212A-M interact with the service provider network 204 and the hosting servers 206 via electronic devices such as, for example, smart phones, tablets, laptop computers, desktop computers, telephones, etc. In configurations, one or more of the participant nodes 212A-M may participate in a media conference that includes one or more of text, audio, video, and/or screen sharing (e.g., a video teleconference (VTC)). The content can be sent between the participant nodes 212A-M via the service provider network 204.

When one or more of the participant nodes 212A-M wish to participate in a network service, an organizer 214 of the network service may send a request 216 for the network service to the service provider network 204. The organizer 214 may also be a participant in the network service. The request 216 may include a date, time, and/or duration for the media conference, as well as a list of participants, e.g., participant nodes 212. The request 216 may also include an anticipated location for each participant node 212.

Based at least in part on geographic locations of the participant nodes 212 that intend to participate in the network service, the service provider network 204 may evaluate performance metrics 218 related to potential hosting servers 206 in various geographical locations with respect to the participant nodes 212 that intend to participate in the network service. For example, the performance metrics 218 may include latency with regard to transmission of audio data packets, video packets, and content packets between participant nodes 212, from the participant nodes 212 to potential hosting servers 206, between the potential hosting servers 206, between the potential hosting servers 206 and Internet Service Providers (ISPs) used by the participant nodes 212.

In configurations, the latency may be with respect to round-trip time (RTT) between the participant nodes 212 and potential hosting servers 206. Based on International Telecommunication Union (ITU) standards, tiers of service may be based on RTT and its impact on quality: Tier-1 0 to 150 milliseconds (ms)—no perceivable impact; Tier-2 150 to 200 ms—some perceivable impact; Tier-3 200 to 300 ms—acceptable impact; Tier-4 300 to 400 ms—significant impact; and Tier-5 above 400 ms—severe impact. In configurations, the network service Tier-4 and Tier-5 are combined into a single tier (e.g., Tier-4) as having an unacceptable impact on quality. In configurations, no participant node 212 should have a Tier-3 service, unless the participant node 212 is an outlier, as will be described further herein, and no participant node 212, including outliers, should have a Tier-4 service. Additional performance metrics 218 may include Quality of Service (QoS), the proximity of the participant nodes 212 to the various potential hosting servers 206, performance of potential hosting servers 206, e.g., capacity of the potential hosting servers 206, stability of the potential hosting servers 206, quality of connection to ISPs used by the participant nodes 212, etc.

The host selection component 210 may gather and evaluate the performance metrics 218 from the potential hosting servers 206 with respect to the participant nodes 212. In configurations, the performance metrics are gathered from the performance of past network services and/or in real-time just prior to the start of the network service. The performance metrics 218 may be gathered based on an anticipated location of the participant nodes 212, e.g., where participants are expected to be located when the participants join the network service, which may be received from, for example, the request 216.

The service provider network 202 regularly monitors itself with respect to performance for health reasons, e.g., the performance and health of the service provider network 202. Based at least on the evaluation of the performance metrics 218, the operational constraints 220, and the user preferences 222, the host selection component 210 may generate scores with respect to each hosting server 206 with respect to participant nodes 212. Based on the scores, the host selection component 210 may generate a list of possible hosting servers 206 for the network service, where the list may include hosting servers 206 ranked based on the scores. In configurations, the list may be a weighted list, where the weights may be based on determined tiers of service for each possible hosting server 206 and/or a calculated score based on the performance metrics 218, the operational constraints 220, and the user preferences 222 for each possible hosting server 206. Thus, the list of ranked hosting servers 206 may rank the hosting servers 206 based on the weighted scores.

The performance metrics 218 may be based upon historical performance metrics (that may be stored in data store 208) in addition to or instead of real time performance metrics. The historical performance metrics may include, for example, RTT, QoS, performance of potential hosting servers 206, e.g., capacity of the potential hosting servers 206, etc. For example, if historical RTT between participant node 212a and a first hosting server 206 typically provides Tier 1 service, and if historical RTT between participant node 212b and the first hosting server 206 typically provides Tier 1 service, then if participant nodes 212a and 212b want to participate in a network service, then the first hosting server 206 may be selected, at least initially, to host the network service. However, if real time RTT data indicates less than Tier 1 service, or if operational constraints indicate that the first hosting server 206 is unavailable for some reason, then a different hosting server 206 may be selected.

In configurations, the performance metrics 218, the operational constraints 220, and the user preferences 222 may be stored in the data store 208. In configurations, the performance metrics 218, the operational constraints 220, and the user preferences 222 may not be stored or may be stored elsewhere in the service provider network 202. The host selection component 210 may select, from the list of ranked hosting servers 206, a hosting server 206 (or hosting servers 206) at a first geographic location for hosting the network service based on the ranking of the hosting servers 206. The selected hosting server 206 may comprise a single hosting server 206 at the first geographic location or may comprise multiple hosting servers 206 at the first geographic location.

The host selection component 210 may consider various operational constraints 220 with respect to the selected hosting server 206, such as if the selected hosting server 206 is "down," or inaccessible to one or more participant nodes 212. The host selection component 210 may also consider capacity issues of hosting servers 206, current testing of hosting servers 206, connection issues (e.g., communication pipelines) between hosting servers 206 and participant nodes 212, regulatory concerns, legal concerns, a time of day, functionality (e.g. software versions), etc., with respect to the selected hosting server 206. For example, the host selection component 210 may determine that the selected hosting server 206 is inaccessible to one or more participant nodes 212. Additionally, the host selection component 210 may determine that regulations and/or laws within the region of the selected hosting server 206 will not allow for the media conference to be hosted by the selected hosting server 206. Further, the host selection component 210 may determine that certain network services require redundancy within an availability zone, such as double or triple redundancy. Thus, based on the operational constraints 220, the host selection component 210 may select another one or more hosting servers 206 from the list, based on the ranking, to host the network service that still provides a good user experience for the participant nodes 212, but also satisfies any operational constraints 220.

In configurations, the operational constraints 220 can also include whether the type of network service is "down," or inaccessible to one or more participant nodes 212. For example, if an organizer 214 is interested in file hosting services that is not available on a selected hosting server 206, the host selection component 210 may select another one or more hosting servers 206 from the list, based on the ranking, to host the network service that still provides a good user experience for the participant nodes 212.

In configurations, the host selection component 210 may also consider user preferences 222. The user preferences 222 may be received from the organizer 214 from, for example, the GUI 700 illustrated in FIG. 7. The user preferences 222 may be stored in the data store 208 or elsewhere in the service provider network 202. For example, the organizer 214 may be part of an organization that is organizing the network service through the service provider network 204. If the user preferences 222 for the organization have certain requirements, then the host selection component 210 may select one or more hosting servers 206 based on the performance metrics 218, the operational constraints 220, and the user preferences 222. For example, the user preferences 222 may stipulate that hosting servers 206 located in a particular region or geographic location may not be used to network service. The user preferences 222 may also stipulate which participant nodes 212 to prioritize for quality of service, the type of algorithm that should be used to determine the hosting server 206, and the length of past performance metrics 218 to use to determine the hosting server 206. Additional examples of user preferences 222 include corporate policies, legal issues, sovereign issues, regulations, potential price differences with respect to different routings between hosting servers 206 and participant nodes 212, etc.

Once a suitable hosting server (or servers) 206 has been selected to host the network service, then the service provider network 204 may facilitate initiation of the network service or may otherwise allow the network service to take place. The host selection component 210 may continually monitor the performance metrics 218. For example, if additional participant nodes 212 join the network service or if participation nodes 212 leave the network service before it is completed, then the host selection component 210 may determine that the network service should be moved to different one or more hosting servers 206 at a different location. For example, during a network service involving participant node 212a, located in New York, and participant node 212b, located in Denver, the hosting server 206 may be located in Chicago, e.g., approximately halfway between New York and Denver. If another participant node 212c located in Miami joins the network service, the host selection component 210 may move the network service to a hosting server 206 located in Dallas (e.g., a location approximately equidistant from all three participant nodes 212a, 212b, and 212c) so that based on the RTT for each participant node 212, all three participant nodes 212 have a Tier 1 service. The service provider network 204 may thus switch the hosting servers 206 hosting the network service during the network service. The dynamic evaluation of ongoing network services may also take into account the operational constraints 220 and/or the user preferences 222 with respect to network performance while dynamically evaluating the network service.

Figure 3:
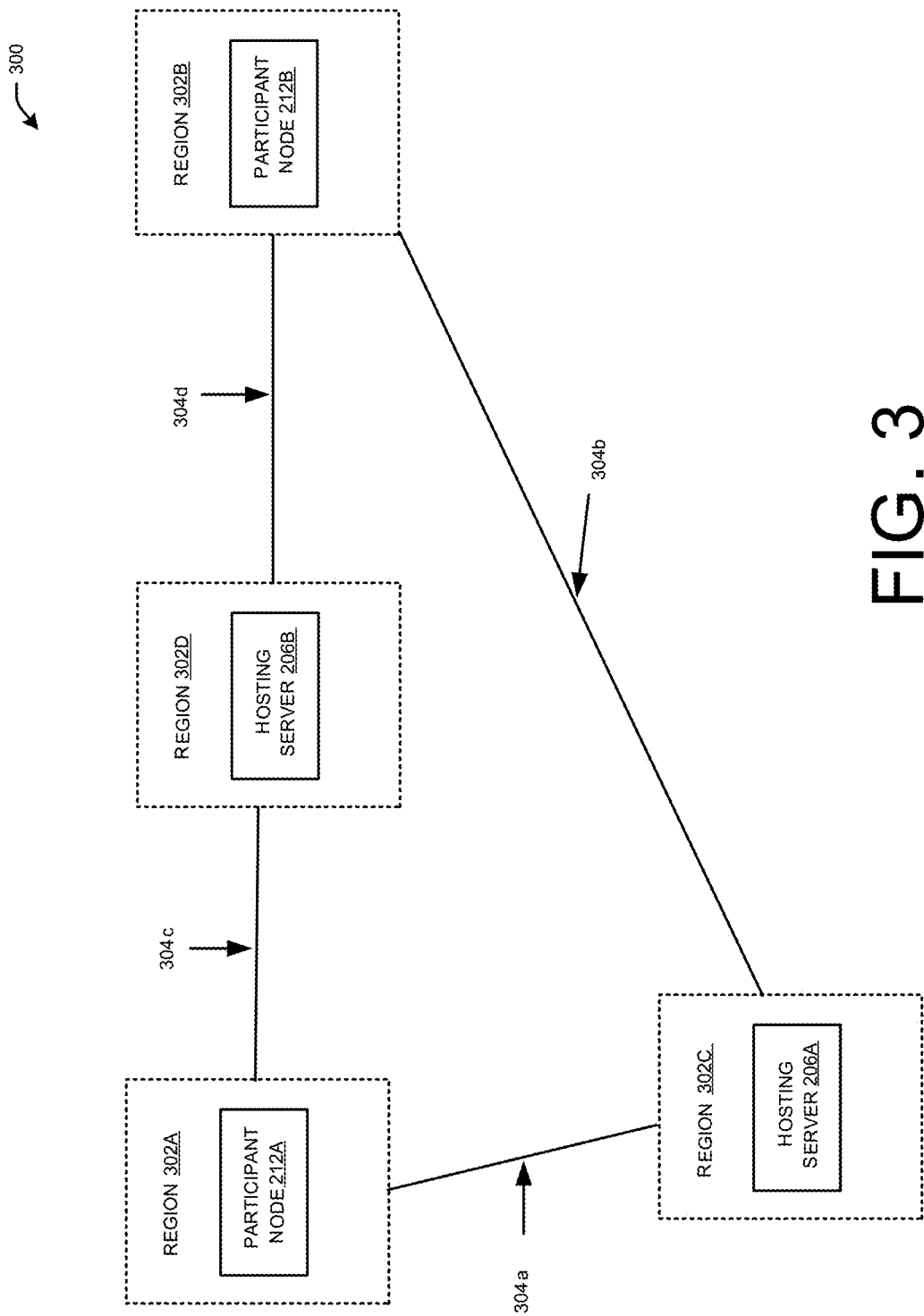
FIG. 3 schematically illustrates another example arrangement of participant nodes and hosting servers of FIG. 2 in different geographical availability zones.
Figure 4:
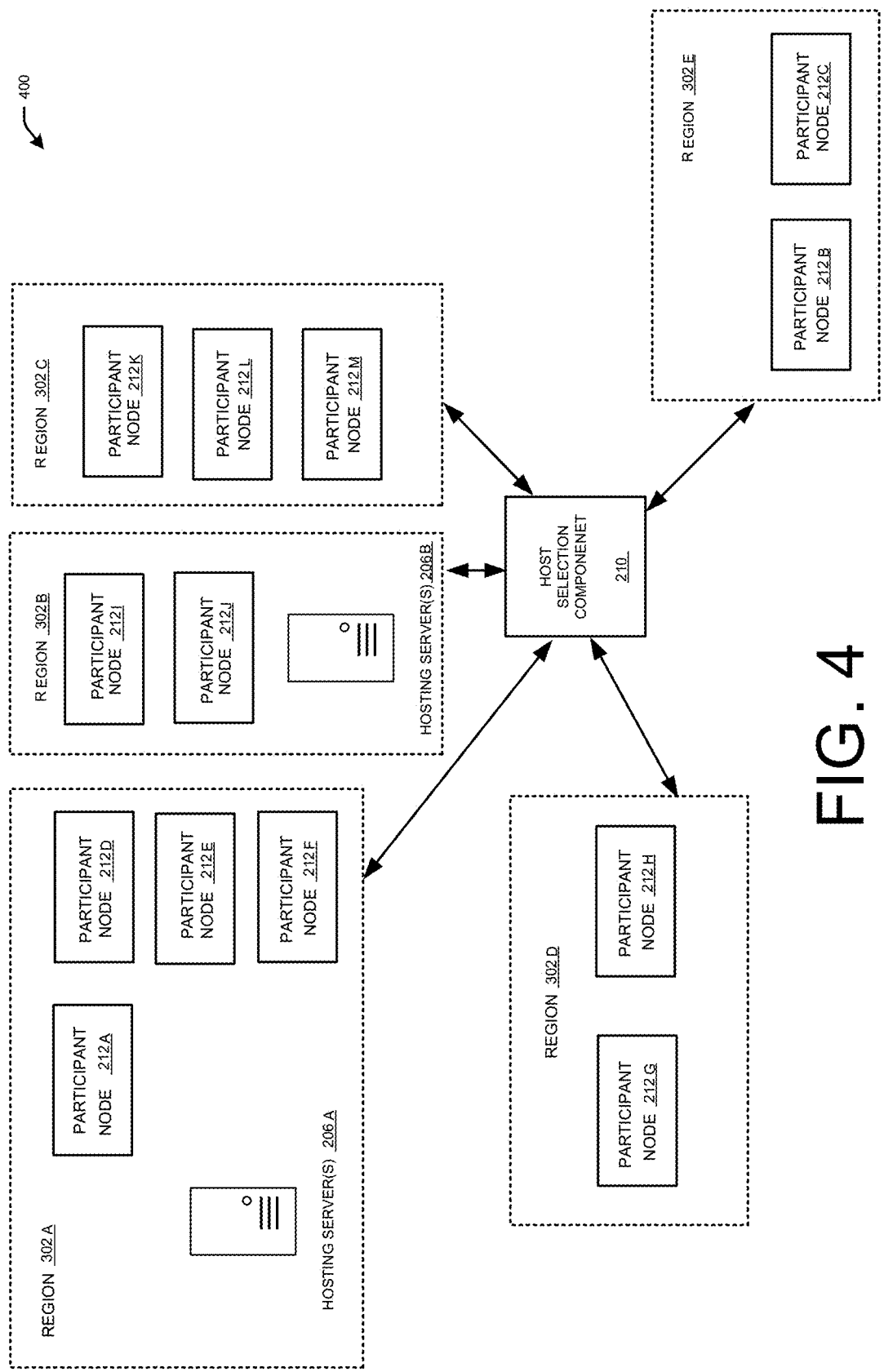
FIG. 4 schematically illustrates another example arrangement of participant nodes and hosting servers of FIG. 2 in different geographical availability zones.
Figure 5:
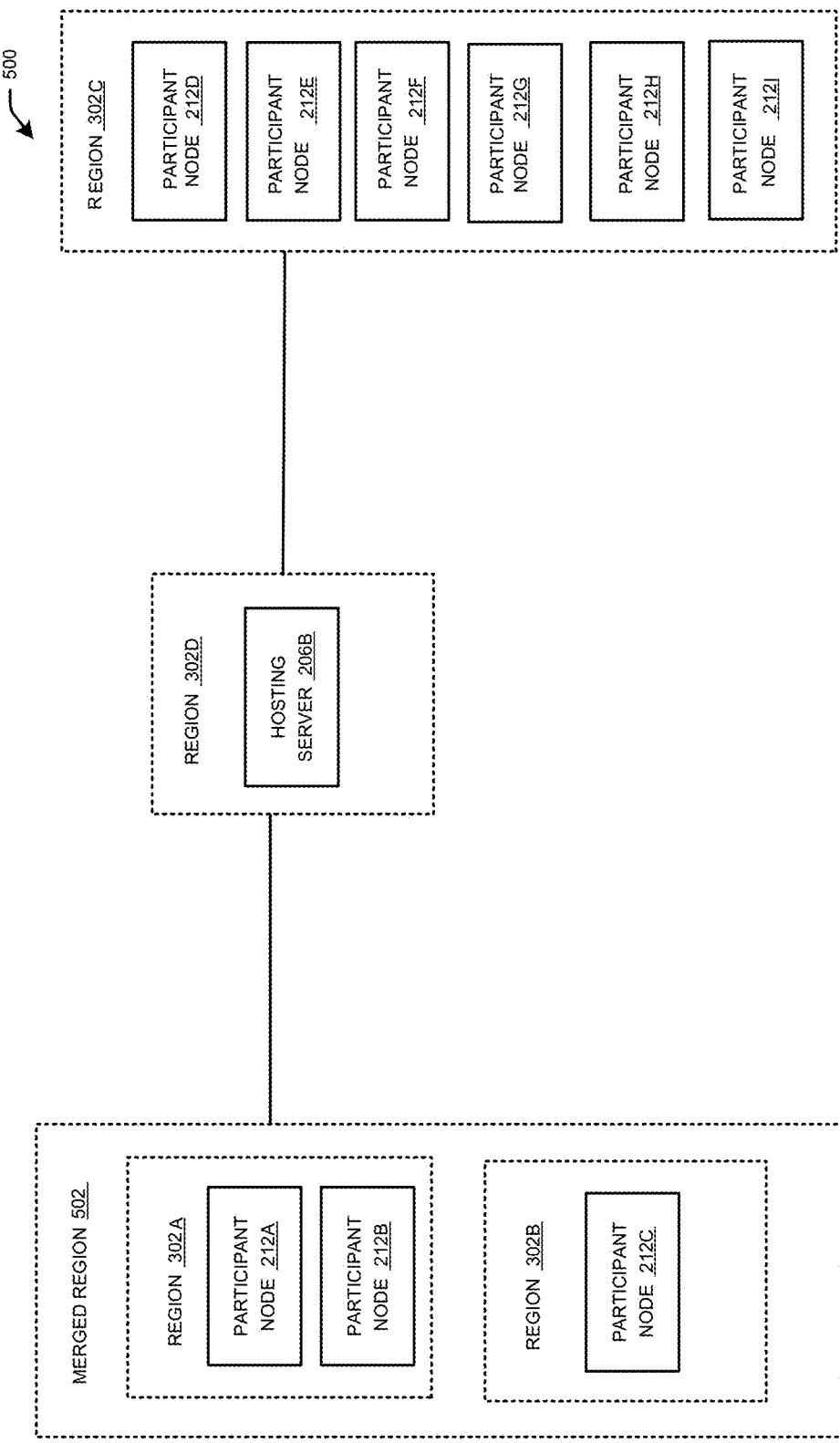
FIG. 5 schematically illustrates yet another example arrangement of participant nodes and hosting servers of FIG. 2 in different geographical availability zones.

FIGS. 3-5 provide examples of selecting availability regions based on performance metrics 218, e.g., RTT, latency, etc., operational constraints 220, and user preferences 222. In configurations, for each network service, the geographical regions 302 for participant nodes 212, e.g., attendee regions, may be determined. The geographical regions 302 may be received within the request 216, may be received from user demographics associated with the participant nodes 212 that are stored in the service provider network 202, or may be based on characteristics of the participant nodes 212, such as an IP address, an ISP, coordinate location information, etc. of the devices used by the participant nodes 212. For each geographical region 302 capable of hosting the network service, e.g., each host region having one or more hosting servers 206, a "score" may be determined by the host selection component 210 for that host region. In configurations, the scores for the host regions may be based on RTT Tier of Service, latency between regions, latency between the hosting servers 206 and the participant nodes 212, the latency between the hosting servers 206 and the ISPs used by the participant nodes 212, or a combination. The scores for the host regions may also be based on operational constraints 220 and user preferences 222. The region 302 having the best or highest score may be selected by the host selection component 210 to host the network service. In configurations, if no participant node 212 is located in the selected region 302 for hosting, e.g., the regions 302 with participant nodes 212 are outside the selected region 302 for hosting, and the selected region for hosting is not an intercontinental hosting hub, e.g., the one or more hosting servers 206 in the selected region are not configured or authorized to host intercontinental media conferences, the next potential region 302 is selected that has the next best/highest score and that is an intercontinental hosting hub.

FIG. 3 schematically illustrates an example arrangement 300 of participant nodes 212a and 212b located in regions 302a and 302b, respectively. Two hosting servers 206a and 206b are located in regions 302c and 302d, respectively. As illustrated, a length of the lines between the regions 302 is representative of respective distances between the regions (e.g., longer lines representing a longer distance and shorter lines representing a shorter distance). Participant node 212a is located close (along line 304a) to region 302c but participant node 212b is located a greater distance (along line 304b) from region 302c. Thus, the RTT for participant node 212a with respect to hosting server 206a (e.g., a shorter distance between regions) is smaller than the RTT for participant node 212b with respect to hosting server 206a (e.g., a longer distance between regions). For example, the latency along line 304a may be 10 milliseconds (ms) and the latency along line 304b may be 90 ms, while the latency along lines 304c and 304d may be 50 ms each. Thus, for example, participant node 212a may have a Tier-1 service with respect to hosting server 206a but participant node 212b may have a Tier-3 service with respect to hosting server 206a. However, hosting server 206b located in region 302c is approximately equidistant from participant node 212a (along line 304c) and participant node 212b (along line 304d). Thus, both participant nodes 212a and 212b may have Tier-1 service or Tier-2 service with respect to hosting server 206b, e.g., an equally good experience for both participant nodes 212a and 212b. Accordingly, the score calculated by host selection component 210 for region 302c may be determined as being better/higher than the score for region 302d, and region 302c that includes hosting server 206b may be selected by the host selection component 210 for hosting a network service between participant nodes 212a and 212b.

FIG. 4 schematically illustrates an example arrangement 400 of participant nodes 212a-212m and hosting server 206a and 206b. The hosting servers 206a and 206b may comprise one or more servers and are located in different geographical regions 302a and 302b, respectively. The participant nodes 212a-212m are located in one of regions 302a-302e. When a first participant node 212a (or the organizer 214) wishes to organize a network service involving the other participant nodes 212, the host selection component 210 evaluates and selects one or more hosting servers 206 within a particular geographical region 302, as previously described.

As illustrated, participant nodes 212b and 212c are the furthest participant nodes 212 in geographic proximity from the hosting servers 206, e.g., are the outliers. Thus, as the host selection component 210 evaluates, e.g., determines scores for regions including hosting servers 206, and selects one or more hosting servers 206, the host selection component 210 may have trouble selecting between hosting servers 206a or 206b because the overall quality, e.g., user experience, for all participant nodes 212 may not meet a predetermined threshold. In configurations, the outlier nodes, such as participant nodes 212b and 212c, can be merged into a single region, such as a the region 302e illustrated in FIG. 4. However, in configurations, the host selection component 210 may disregard or eliminate the outlier participant nodes 212b and 212c from consideration in evaluating potential hosting servers 206. For example, if regions 302a-302d are in North America but region 302e is in South Africa, there may be no regions 302 that include hosting servers 206, e.g., regions 302b and 302c, that will allow for all participant nodes 212a-212m to achieve Tier-1 or Tier-2 service during a media conference based on RTT. Thus, the scores for each region 302 that includes one or more hosting servers 206 determined by the host selection component 210 may not meet a predetermined threshold. By eliminating participant nodes 212b and 212c, scores for regions 302a and 302b may reach a desired level such that participant nodes 212a and 212d-212m may now achieve a desired level of quality. For example, after eliminating participant nodes 212b and 212c, the host selection component 210 may, based on the determined scores, select region 302b and hosting server 206b for hosting the network service. Thus, a quorum of the participant nodes 212 is able to achieve a desired quality level by dropping outlier participant nodes 212b and 212c from consideration in determining one or more hosting servers 206. The participant nodes 212a and 212d-212m may have at least close to an equally good experience during the network service as described with respect to FIG. 3, while participant nodes 212b and 212c may only have acceptable experiences during the network service that is less than the experience of participant nodes 212a and 212d-212m.

FIG. 5 schematically illustrates an example arrangement 500. In configurations, when evaluating potential hosting servers 206, participant nodes 212 may be within different regions 302, e.g., different countries but on the same continent, with respect to each other but may be grouped together as being in the same region 302. For example, participant nodes 212a and 212b are located in region 302a, while participant nodes 212c is located in region 302b. In configurations, regions 302a and 302b may be "merged" into a merged region 502, e.g., considered to be within the same region, 502 for purposes of evaluating potential hosting servers 206. To merge the regions 302a and 302b, in configurations a quorum may be calculated. The quorum may be calculated in order to attempt to achieve an even distribution of participant nodes 212 within regions. The quorum may be determined by the region 502 having the lowest number of participant nodes 212 multiplied by half (50% of participant nodes 212 to provide even distribution between regions 302). In configurations, if the quorum is less than 2, then the quorum may be set at 2 since the quorum cannot be less than 2. Regions 302 having a number of participation nodes 212 less than the quorum may be merged into adjacent regions 302. The adjacent region 302 may be based on geographical location or may be based on a threshold of latency between two regions, e.g., less than 50 milliseconds (ms). Regions 302 without a quorum may be merged with adjacent regions 302 having a quorum or may be merged with other regions 302 not having a quorum. Once regions have been merged, the host selection component 210 may determine scores and select a region for hosting as previously described. This can allow for achieving desired quality levels for the network service.

Thus, in the example of FIG. 5, the quorum is 2. Region 302a has two participation nodes 212a and 212b, thus providing a potential quorum of 2, region 302b has a single participation node 212c, thus providing a potential quorum number of 2, and region 302c has 6 participation nodes 212d-212i, thus providing a potential quorum number of 3. Since region 302b has only a single participation node 212c, regions 302a and 302b may be merged into the merged region 502 since they are adjacent regions.

Figure 6:
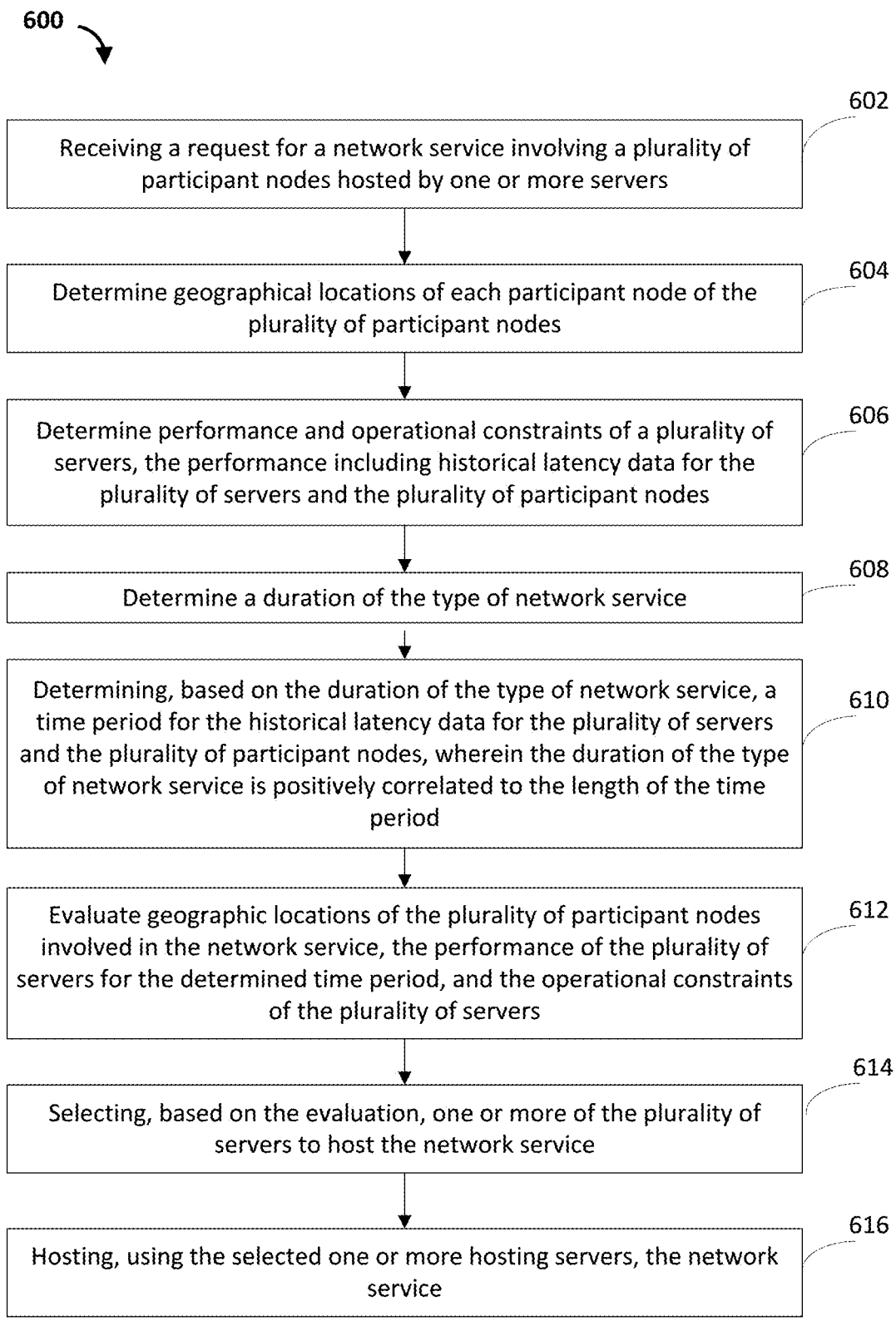
FIG. 6 is a flowchart showing an example process for selecting hosting servers for network services.

FIG. 6 illustrates a flow diagram of an example method 600 that illustrates aspects of the functions performed at least partly by the service provider network 202. The logical operations described herein with respect to FIG. 6 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 6, and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

The example method 600 may be implemented to select hosting servers 206 or availability zones for network services of the service provider network 202. For example, the method 600 may be implemented to select hosting servers 206 based on performance metrics 218, operational constraints 220, and user preferences 222.

At block 602, a request for a network service involving a plurality of participant nodes hosted by one or more servers is received, for example, by the service provider network 202. The Network services can be established between the organizer 214 and one of more of the participant nodes 212A-M, or only between the participant nodes 212A-M. The network service can include a virtual machine instance, file hosting, cloud computing, a project platform, a document platform, audio conferencing, video conferencing, chatting, or gaming service. In configuration, two or more network services can be included in the request. The one or more servers can transmit audio data, video data, and content data as part of the network services.

The network service can be established by the service provider network 204 in response to the request 216 from the organizer 214. The request 216 may include an identifier of the organizer 214, identifiers of the participant nodes 212A-M, a date, time, and/or duration for the network service. The request 216 may also include an anticipated location for each participant node 212A-M. The organizer 214 of different network services may be the same or may be different.

Figure 7:
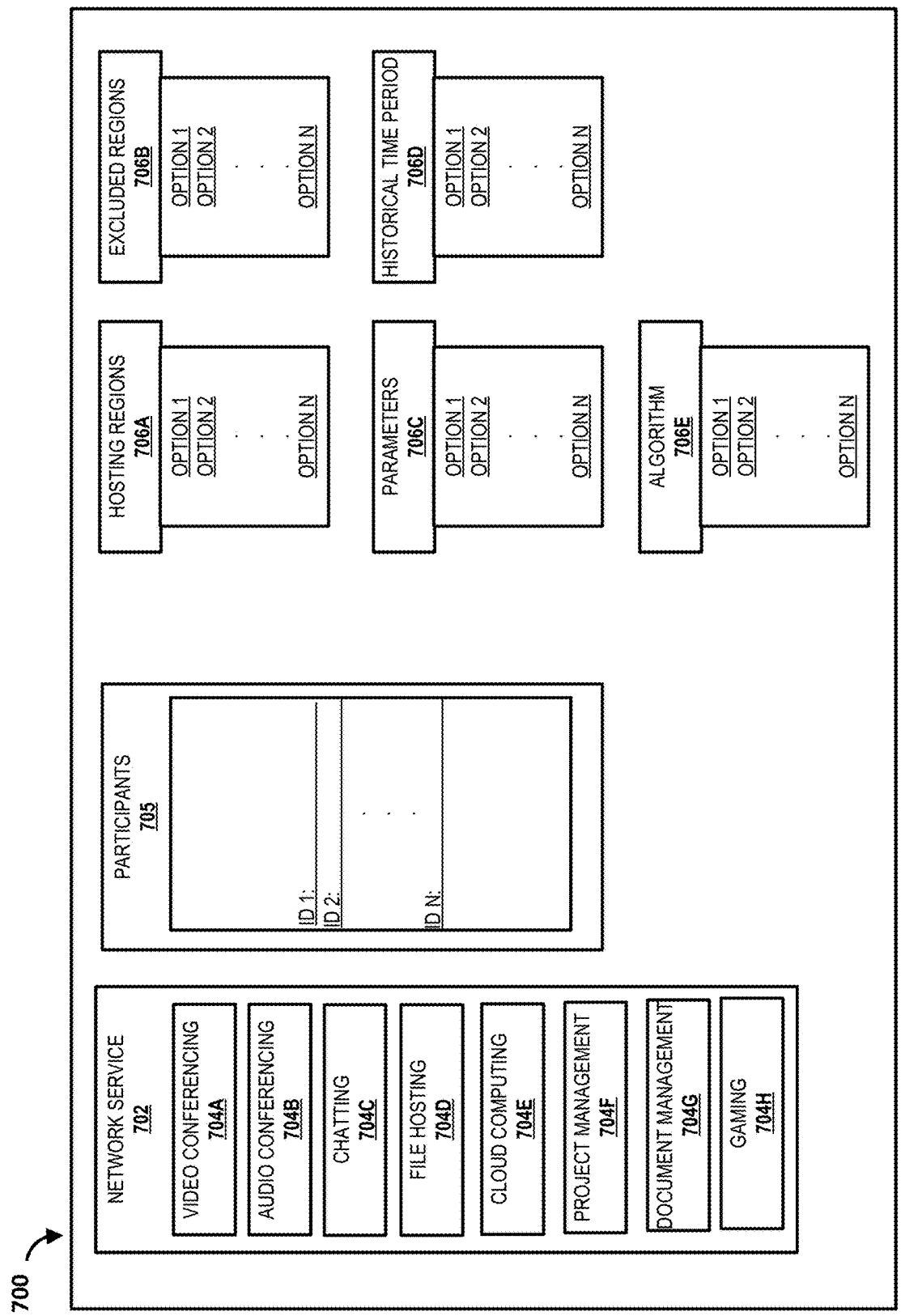
FIG. 7 is a screen diagram showing an illustrative graphical user interface ("GUI") that displays parameters that can be selected by an organizer of a network service.
Figure 10:
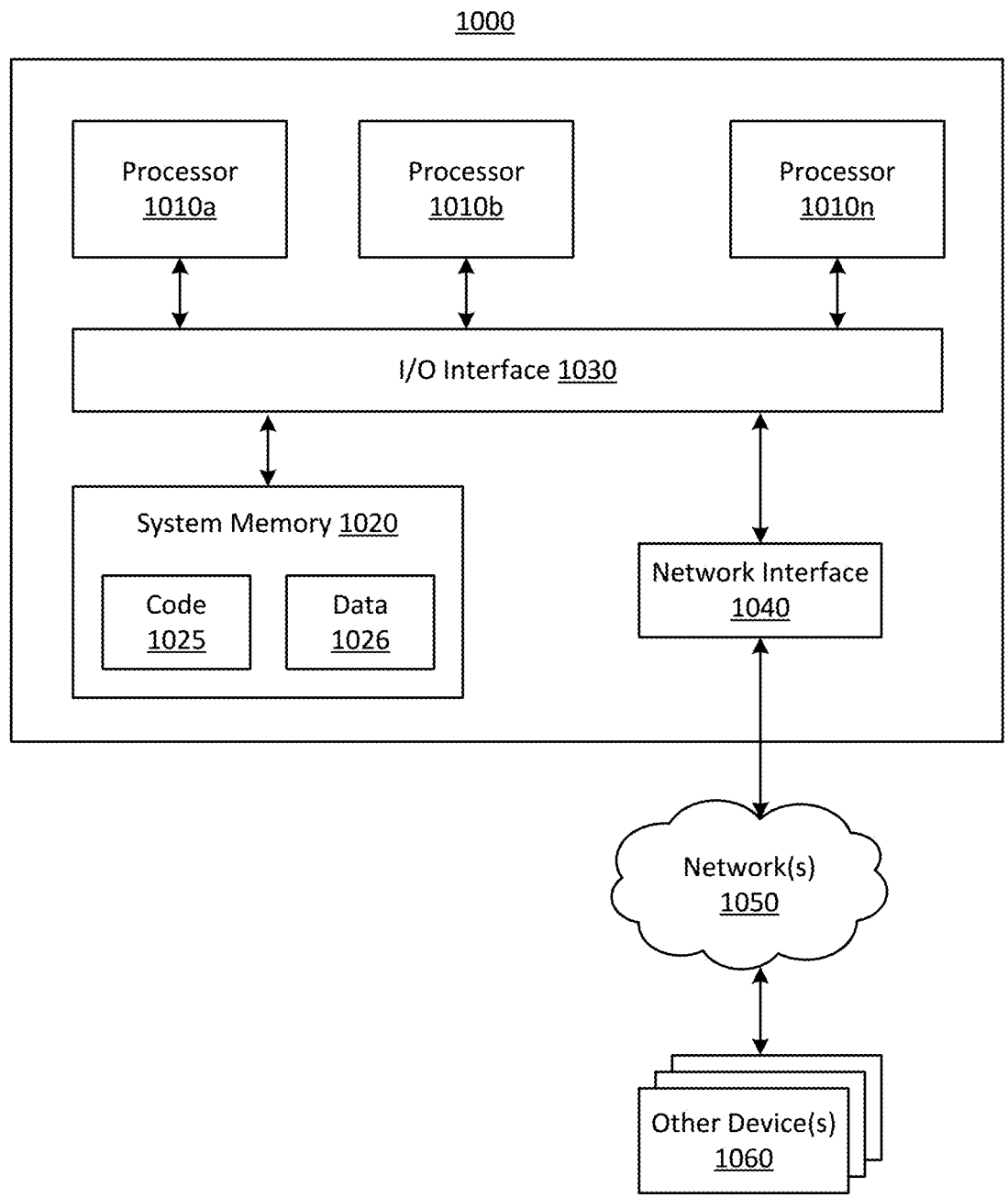
FIG. 10 is a diagram illustrating an example computing system that may be used in some embodiments.

In an implementation, the request 216 can be provided by, for example, the organizer 214 using a graphical user interface, such as the graphical user interface 700 illustrated in FIG. 7, using a computer device, such as illustrated in FIG. 10. The graphical user interface (GUI) 700 can enable an organizer to select the type of network service, identifications of the participants of the network service, preferred hosting regions, excluded hosting regions, user parameters, historical time periods of performance metrics, and an algorithm for evaluating the data and selecting optimal hosting servers. In some embodiments, the type of network service can be a default network service, such as a media, video, or audio conference. In such instances, the GUI 700 may not enable an organizer to select the type of network service.

FIG. 7 is a screen diagram showing an illustrative GUI 700 that displays selections received from the organizer 214. GUI 700 could be part of an end-user program or the operating system of the computing device, or a combination thereof. As illustrated, the GUI 700 permits the selection of various options and the entry of data. A user device 106 associated with the organizer 214 may display the GUI 700. The GUI 700 is illustrated for purposes of explanation and is not intended to be limiting. For example, the GUI 700 may receive additional parameters, receive fewer parameters, have different input options, such a radio buttons, and/or have a different layout.

As discussed above, the organizer 214 may select one or more types of network services 702. The type of network service can be selected as, for example, video conferencing 704A, audio conferencing 704B, chatting services 704C, file hosting services 704D, cloud computing services 704E, project management services 704F, document management services 704G, and gaming services 704H. These types of network services are merely illustrative and other types of network services are contemplated within this disclosure. The organizer 214 might select or deselect the one or more types of network services 702 by selecting the user interface elements 704A-H.

The organizer 214 may also identify the participants of the network service. In the interface element 705 illustrated in GUI 700, the organizer 214 can provide the identifiers of the participants. However, in some embodiments, a dropdown list can be provided from which the organizer 214 can select from among prepopulated participant identifiers. The prepopulated participants may be, for example, members of the same organization as the organizer 214. The organizer 214 can also identify the ISP that each participant is using and a geographic location of each participant. In some embodiments, regulatory considerations for each participant can also be provided by the organizer 214.

In the interface element 706A illustrated in GUI 700, the organizer 214 can select one or more preferred hosting regions for the network service. For examples, a United States government contractor may require that the hosting region be in the United States for regulatory reasons. In the interface element 706B illustrated in GUI 700, the organizer 214 can select one or more hosting regions that are excluded from the network service. In some embodiments, certain hosting regions can be excluded by the organizer 214 due to regulatory and or legal constraints. For example, the organizer 214 may not wish to host the network service in a region having an intrusive firewall. In another example, certain subject matter may not be able to be hosted in certain geographic regions. In the interface element 706C in GUI 700, the organizer 214 can select one or more user parameters of the network service. In some embodiments, the user parameters can be the specific performance metrics that are used to select the host server. For example, the packet telemetry can be used but the ISP may not be considered. In another example, the latency between the host servers can be considered but the latency between the host servers and the participant nodes 212 may not be considered. In some embodiments, redundancy can be selected, such as double or triple redundancy. In some embodiments, the health of a hosting server or a hosting region can be selected.

In the interface element 706D illustrated in GUI 700, the organizer 214 can select a historical time period for which performance metrics are considered when selecting the host server. In some embodiments, the organizer 214 can select this historical time period using interface element 706D. However, in some embodiments, the host selection component 210 can select the historical time period based on the type of network service and, in particular, an expected duration of the type of network service. As explained in further detail below, the longer the expected duration of the network service, the longer the time period for which performance metrics may be considered for selecting the host server. For example, if the request 216 for a network service is a request for a 30 minute video conference later in the same day, the historical time period for the performance metrics may be the previous day. In another example, if the request for the network service is a request for one year of file hosting, the historical time period for the performance metrics may be the previous quarter or the previous year to analyze long term quality of the network service.

In the interface element 706E illustrated in GUI 700, the organizer 214 can select a heuristic model or algorithm for selecting the host server. In some examples, a plurality of predetermined heuristic models can be provided for selecting the host server. For example, one heuristic model may weigh the geographic location of the participants of the network service more heavily than another model. In such an example, a hosting server is more likely to be selected in the geographic region of a majority of the participants. In another example, a heuristics model may weigh the most recent performance metrics of the hosting servers more heavily than older performance metrics of the hosting servers. In such an example, a hosting server that is more recently reliable with lower latency is more likely to be selected relative to a hosting server that may have traditionally been more reliable, but may have recent performance issues due to, for example, an outage. In another example, a heuristics model may weigh some participant nodes 212 more heavily than other participant nodes 212. In such an example, a hosting server that provides better performance for the more heavily weighted participant nodes 212 is more likely to be selected relative to a hosting server that provides better performance for the less weighted participant nodes 212. In another example, a heuristics model may rank all of the participant nodes 212 and then weigh the experience of the participant nodes 212 for each hosting server based on that ranking. In another example, a heuristics model may exclude outliers, such as the lowest priority participant nodes 212, from the determination. In some embodiments, the algorithm can optimize performance for all the participant nodes 212, optimize performance the region having the most participant nodes 212, select a hosting server that is at a geographic midpoint of the participant nodes 212. In some embodiments, as described in greater detail with reference to FIG. 8 below, a learning algorithm, such as machine learning, artificial intelligence, and/or other statistical modeling techniques, may be used to select the hosting server.

In some examples, a user might also be able to customize the GUI 700. For instance, in response to selecting a customize UI element (not shown), a user may then be prompted to select the different information that they would like to include in the display of the GUI 700. For example, a user may select from a list (or some other UI element or input method) the inputs that they would like displayed or considered for selection of a hosting server, as well as how the inputs are displayed.

At block 604, geographical locations of each participant node of the plurality of participant nodes may be determined. In some embodiments, as described above, the geographical locations of each participant node may be provided by the organizer 214 using the interface element 705 illustrated in GUI 700. In some embodiments, the geographical locations of the participant notes may be determined based on tracking objects that are received from each of the participant nodes 212 as the participant nodes 212 connect to the hosting server 206. The tracking object may be a cookie, a token, or another such object that identifies a participant node 212A-M and/or a user of the participant node 212A-M. The tracking object may be based on identification information or login information of the user, such as a username. The geographical location can be a latitude/longitude coordinates, continent, country, province, state, county, city, or address of the participant nodes 212. The geographic location of each participant node 212 can be determined based on, for example, the received IP address of each device. In some embodiments, the geographic location of each participant can be retrieved from demographic information saved by the service provider network 202.

At block 606, the performance and operational constraints of the plurality of servers are determined. In some embodiments, the performance of the plurality of servers can include RTT, latency between the plurality of servers, latency between the plurality of servers and the participant nodes 212, latency between the plurality of servers and ISPs used by the participant nodes 212, or a combination thereof. In addition, the performance metrics may distinguish between latency with regard to transmission of audio data packets, video data packets, and content data packets, e.g., audio quality, video quality, and content quality. In some embodiments, operation constraints of the plurality of servers comprise at least one of redundancy within an availability zone, availability of the type of network service on one or more of the plurality of servers, availability one or more of the plurality of servers, capacity of one or more of the plurality of network services, capacity of one or more of the plurality of servers, time of day, legal issues, and regulations. For example, certain network services may require double or triple redundancy in some availability zones. Therefore, availability zones without redundancy many not be considered for hosting for certain network services.

At block 608, a duration of the type of network service can be determined. In some embodiments, the organizer 214 can select the duration of the network service using the interface element 702 illustrated in GUI 700. In other embodiments, the duration can be determined based on the type of network service. For example, a media conference can be known to have a relatively short duration whereas a file hosting service can be known to have a relatively long duration. The durations of the different types of network services can be stored in the data store 208 and referenced upon selection of the type of network service using the interface element 702 illustrated in GUI 700. In some embodiments, the durations can be defined by a number of minutes, hours, days, months, quarters, and/or years. In some embodiments, the durations can be classified in categories, such as, short-term, medium-term, and long-term. In implementations, the durations can be associated with the types of network services in advance by user and provided to the service provider network 202. In some embodiments, the service provider network 202 can determine the durations for the different types of network services based on historical durations for different network services analyzed over time.

At block 610, a time period for the historical latency data for the plurality of servers and the plurality of participant nodes can be determined based on the duration of the type of network service. As the duration of the network service is longer, the reliability of the host server should also be proven over a longer period of time to ensure quality service. As such, in some embodiments, the duration of the type of network service is positively correlated to the length of the time period that is used to evaluate the performance metrics. For example, if the request 216 for a network service is a request for a 30 minute video conference later in the same day, the historical time period for the performance metrics, such as the latency data, may be the previous day. In another example, if the request for the network service is a request for one year of file hosting, the historical time period for the performance metrics may be the previous quarter or the previous year. If a new host server or new region is introduced in the network, or certain network services are added to an existing host service or region, then there may not be enough performance metrics to evaluate and, thus, the new host server may not be selected although it may offer the best experience. Therefore, the time period for the historical latency data may be shortened for host server or region that have recently come online, i.e., come online sooner than the time period.

At block 612, geographic locations of the plurality of participant nodes involved in the network service, the performance of the plurality of servers for the determined time period, and the operational constraints of the plurality of servers are evaluated. The performance data 218 of the plurality of servers can be retrieved from the data store 208. In some embodiments, the types of data or sensors used for the evaluation can be specified by the organizer 214 using interface element 706C illustrated in GUI 700. Some of the sensors used by the host selection component 210 may always be evaluated, such as the geographic locations of the participants, the performance of the plurality of servers, and the operational constraints. For example, the latency between the plurality of servers and the plurality of participant nodes 212 may always be evaluated. However, the latency between the plurality of servers and the ISPs of the participant nodes may only be evaluated if the organizer 214 selects such a sensor. In some embodiments, at least one of regulatory, legal, and policy constraints for the plurality of servers can also be evaluated.

In some embodiments, the performance of the plurality of servers for the determined time period is initially used to evaluate the plurality of servers. The servers having adequate performance, i.e., having performance above a threshold level, are then checked to determine whether they are in compliance with operational constraints, such as the operational constraints 220 including regulatory, legal, and policy constraints. These servers may also be checked with respect to user preferences 222. If the servers are not in compliance with operational constraints 220 or user preferences 222, then other servers of the plurality of servers can be evaluated at step 612.

A list of potential servers for hosting may be generated following evaluation. The list may rank servers based on a score assigned during the evaluation. In some embodiments, an entirety of the list of potential servers for hosting may be presented to the organizer 214 in ranker order. In some embodiments, the scores can be determined based on the selected heuristic model specified by the organizer 214 using interface element 706E illustrated in GUI 700. These heuristic models can be provided to the service provider network 202 in advance. In some embodiments, the scores may be determined by a learning algorithm, such as machine learning, artificial intelligence, and/or other statistical modeling techniques that have been trained based on past performance of network services. These training inputs may include, for each network service, geographic locations of the plurality of participant nodes, the performance of the plurality of servers, and the selected hosting server. The learning algorithm may generate a model, such as a neural network, vector machine, Bayesian network, and/or the like. The learning algorithm may be refined over time as network services are competed, as described further in connection with FIG. 8. The model may automatically indicate certain patterns for selecting optimal host servers for different network services.

At block 614, one or more of the plurality of servers to host the network service are selected based on the evaluation. For example, based on the list of ranked servers, one or more servers 206 may be selected that operationally may provide the best experience for all, or most, of the participant nodes 212 during the network service. For example, the hosting server with the highest score can be selected to host the network service. If there is a tie between potential servers in the rankings, then the order of the tied servers can be changed for different organizer to avoid selection of the same potential server. The selected server can be in an availability zone or geographic region.

At block 616, the network service may be hosted using the selected one or more hosting servers. In some embodiments, an invite or link to the network service may include a reference to the selected one or more hosting servers. In some embodiments, an organized network service may be associated with the selected one or more hosting servers in the service provider network 202. In some embodiments, the selected one or more hosting servers can be displayed to the organizer 214 in a graphical user interface following selection. The organizer 214 can then approve the selection of the one or more hosting servers before the start of the network service. As participants enter or leave the network service, and/or the performance metrics of the hosting server change to an unacceptable level, the plurality of servers can be reevaluated with updated geographic locations of the present participant nodes 212, the type of network service, the performance of the plurality of servers, and the operational constraints of the plurality of servers to reselect another of the plurality of servers to host in network service. In some embodiments, instead of reevaluating, the service provider network 202 can select the next highest score from the list of ranked servers once performance of the initial server is unacceptable. As such, in some embodiments, a network service can migrate automatically or can migrate in response to a request from the organizer 214. In some embodiments, another server can be selected during reevaluation if it has a higher score for more optimal service even if the initial server is still operating at acceptable levels.

Figure 8:
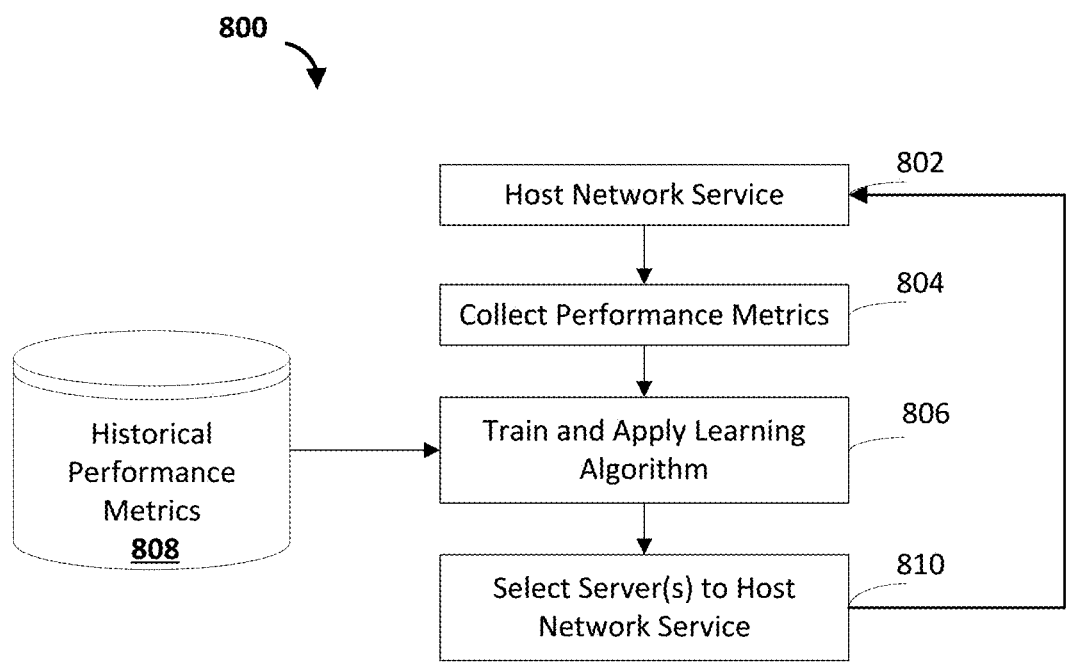
FIG. 8 is a flowchart showing an example process for training a learning algorithm to select hosting servers for network services.

FIG. 8 is a flowchart showing an example process 800 for training a learning algorithm to select hosting servers for network services. The logical operations described herein with respect to FIG. 8 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 8, and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

At block 802, the network service is being hosted by the selected server. This step maybe similar to step 616 of method 600. At block 804, during the network service and/or following completion of the network service, performance metrics, including latency data, can be collected by the service provider network 202. In addition, performance metrics across the network between the servers and the participant nodes 212 are continually collected. All of the collected performance metrics of the network can be stored in data store 808.

At block 806, the performance metrics being collected in real time from the network service and the historical performance metrics stored in data store 808 can be used to continually train a learning algorithm, such as a machine learning, artificial intelligence, and/or other statistical modeling. At block 810, the learning algorithm can be used to select an updated optimal server to host the network service. This analysis can be continually done such that, as new performance metrics are collected during the network service, the optimal server to host a network service may change or migrate. Such a change may be determined if the performance of the initial server is compromised due to an incident in the geographic region hosting the initial server. The network service can then be migrated to the updated host server.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIGS. 6 and 8, and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

Figure 9:
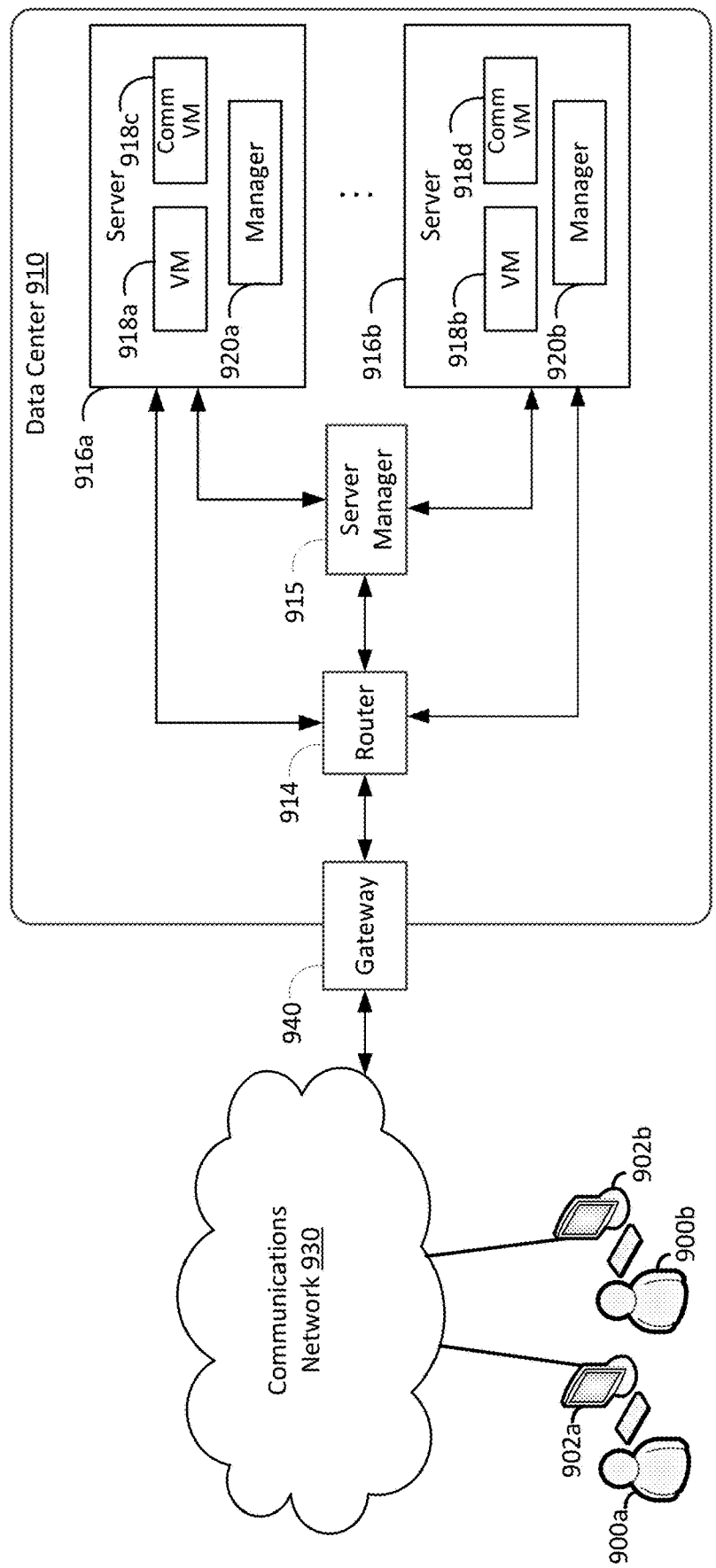
FIG. 9 is a diagram illustrating an example computing system that may be used in some embodiments.

FIG. 9 illustrates an example computing environment in which the embodiments described herein may be implemented. The example computing environment of FIG. 9 may be configured to implement one or more of the services platform, such as the network services 104, the host selection system 110, or a combination thereof of FIG. 1. The example computing environment of FIG. 9 may be configured to implement the service provider network 204 of FIG. 2. The example computing environment of FIG. 9 may be configured to implement any of the methods described herein, such as any methods (e.g., or any operations) associated with FIGS. 6 and 8.

FIG. 9 is a diagram schematically illustrating an example of a data center 910 that can provide computing resources to users 900a and 900b (which may be referred herein singularly as user 900 or in the plural as users 900) via user computers 902a and 902b (which may be referred herein singularly as computer 902 or in the plural as computers 902) via a communications network 930. Data center 910 may be configured to provide computing resources for executing applications on a permanent or an as-needed basis. The computing resources provided by data center 910 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be general-purpose or may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These web services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols such as transmission control protocol (TCP) and less reliable transport layer protocols such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 910 may include servers 916a-b (which may be referred herein singularly as server 916 or in the plural as servers 916) that provide computing resources. These resources may be available as bare metal resources, or as virtual machine instances 918a-d and (which may be referred herein singularly as virtual machine instance 918 or in the plural as virtual machine instances 918). Virtual machine instances 918c and 918d can be communication service virtual machine. The communication service virtual machine instances 918c and 918d may be configured to perform all or any portion of the communication services (e.g., contact center services, virtual environment services, determining virtual features, facilitating communication sessions, content services for accessing virtual environments) in accordance with the present disclosure and described in detail herein. As should be appreciated, while the particular example illustrated in FIG. 9 includes one communication service virtual machine in each server, this is merely an example. A server may include more than one communication service virtual machine or may not include any communication service virtual machines.

The availability of virtualization technologies for computing hardware has provided benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 9, communications network 930 may, for example, be a publicly accessible network of linked networks and possibly operated by various distinct parties, such as the Internet. In other embodiments, communications network 930 may be a private network, such as, a corporate or university network that is wholly or partially inaccessible to non-privileged users. In still other embodiments, communications network 930 may include one or more private networks with access to and/or from the Internet.

Communication network 930 may provide access to computers 902. User computers 902 may be computers utilized by users 900 or other customers of data center 910. For instance, user computer 902a or 902b may be a server, a desktop or laptop personal computer, a tablet computer, a wireless telephone, a personal digital assistant (PDA), an e-book reader, a game console, a set-top box or any other computing device capable of accessing data center 910. User computer 902a or 902b may connect directly to the Internet (e.g., via a cable modem or a Digital Subscriber Line (DSL)). Although only two user computers 902a and 902b are depicted, it should be appreciated that there may be multiple user computers.

User computers 902 may also be utilized to configure aspects of the computing resources provided by data center 910. In this regard, data center 910 might provide a gateway or web interface through which aspects of its operation may be configured through the use of a web browser application program executing on user computer 902. Alternately, a stand-alone application program executing on user computer 902 might access an application programming interface (API) exposed by data center 910 for performing the configuration operations. Other mechanisms for configuring the operation of various web services available at data center 910 might also be utilized.

Servers 916 shown in FIG. 9 may be standard servers configured appropriately for providing the computing resources described above and may provide computing resources for executing one or more web services and/or applications. In one embodiment, the computing resources may be virtual machine instances 918. In the example of virtual machine instances, each of the servers 916 may be configured to execute an instance manager 920a or 920b (which may be referred herein singularly as instance manager 920 or in the plural as instance managers 920) capable of executing the virtual machine instances 918. The instance managers 920 may be a virtual machine monitor (VMM) or another type of program configured to enable the execution of virtual machine instances 918 on server 916, for example. As discussed above, each of the virtual machine instances 918 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 910 shown in FIG. 9, a router 914 may be utilized to interconnect the servers 916a and 916b. Router 914 may also be connected to gateway 940, which is connected to communications network 930. Router 914 may be connected to one or more load balancers, and alone or in combination may manage communications within networks in data center 910, for example by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 910 shown in FIG. 9, a server manager 915 is also employed to at least in part direct various communications to, from and/or between servers 916a and 916b. While FIG. 9 depicts router 914 positioned between gateway 940 and server manager 915, this is merely an exemplary configuration. In some cases, for example, server manager 915 may be positioned between gateway 940 and router 914. Server manager 915 may, in some cases, examine portions of incoming communications from user computers 902 to determine one or more appropriate servers 916 to receive and/or process the incoming communications. Server manager 915 may determine appropriate servers to receive and/or process the incoming communications based on factors such as an identity, location or other attributes associated with user computers 902, a nature of a task with which the communications are associated, a priority of a task with which the communications are associated, a duration of a task with which the communications are associated, a size and/or estimated resource usage of a task with which the communications are associated and many other factors. Server manager 915 may, for example, collect or otherwise have access to state information and other information associated with various tasks in order to, for example, assist in managing communications and other operations associated with such tasks.

It should be appreciated that the network topology illustrated in FIG. 9 has been greatly simplified and that many more networks and networking devices may be utilized to interconnect the various computing systems disclosed herein. These network topologies and devices should be apparent to those skilled in the art.

It should also be appreciated that data center 910 described in FIG. 9 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

In at least some embodiments, a server that implements a portion or all of one or more of the technologies described herein may include a general-purpose computer system that includes or is configured to access one or more computer-accessible media. FIG. 10 depicts a general-purpose computer system that includes or is configured to access one or more computer-accessible media. The example computer system of FIG. 10 may be configured to implement one or more of the services platform, such as the network services 104 and the host selection system 110. The general-purpose computer system of FIG. 10 may be configured to implement the service provider network 204 of FIG. 2. The general-purpose computer system of FIG. 10 may be configured to implement any of the methods described herein, such as any methods (e.g., or any operations) associated with FIGS. 6 and 8.

In the illustrated embodiment, computing device 1000 includes one or more processors 1010a, 1010b and/or 1010n (which may be referred herein singularly as "a processor 1010" or in the plural as "the processors 1010") coupled to a system memory 1020 via an input/output (I/O) interface 1030. Computing device 1010 further includes a network interface 1040 coupled to I/O interface 1030.

In various embodiments, computing device 1000 may be a uniprocessor system including one processor 1010 or a multiprocessor system including several processors 1010 (e.g., two, four, eight or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC or MIPS ISAs or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 1020 as code 1025 and data 1026.

In an embodiment, I/O interface 1030 may be configured to coordinate I/O traffic between processor 1010, system memory 1020 and any peripherals in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computing device 1000 and other device or devices 1060 attached to a network or networks 1050, such as other computer systems or devices, for example. In various embodiments, network interface 1040 may support communication via any suitable wired or wireless general data networks, such as types of Ethernet networks, for example. Additionally, network interface 1040 may support communication via telecommunications/telephony networks such as analog voice networks or digital fiber communications networks, via storage area networks such as Fiber Channel SANs (storage area networks) or via any other suitable type of network and/or protocol.

In some embodiments, system memory 1020 may be a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 1000 via I/O interface 1030. A non-transitory computer-accessible storage medium may also include any volatile or non-volatile media such as RAM (e.g. SDRAM, DDR SDRAM, RDRAM, SRAM, etc.), ROM (read only memory) etc., that may be included in some embodiments of computing device 1000 as system memory 1020 or another type of memory. Further, a computer-accessible medium may include transmission media or signals such as electrical, electromagnetic or digital signals conveyed via a communication medium such as a network and/or a wireless link, such as those that may be implemented via network interface 1040. Portions or all of multiple computing devices such as those illustrated in FIG. 10 may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A network set up by an entity such as a company or a public sector organization to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As an example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method comprising:
receiving, at a service provider network, a request for a network service involving a plurality of participant nodes hosted by one or more servers, the request comprising a type of the network service, identifiers of the plurality of participant nodes, and parameters of the one or more servers;
determining geographical locations of each participant node of the plurality of participant nodes;
determining performance and operational constraints of a plurality of servers, the performance including historical latency data for the plurality of servers and the plurality of participant nodes, at least two of the plurality of servers being located in different geographical locations;
determining a duration of the type of the network service; and
determining, based on the duration of the type of the network service, a time period for the historical latency data for the plurality of servers and the plurality of participant nodes, wherein the duration of the type of the network service is positively correlated to a length of the time period;
evaluating geographic locations of the plurality of participant nodes involved in the network service, the performance of the plurality of servers for the determined time period, and the operational constraints of the plurality of servers;
selecting, based on the evaluation, one or more of the plurality of servers to host the network service; and
hosting, using the selected one or more hosting servers, the network service.

2. The method of claim 1, wherein the performance of the plurality of servers comprises at least one of performance of transmitting audio data, performance of transmitting video data, and performance of transmitting content data.

3. The method of claim 1, wherein evaluating the geographic locations of the plurality of participant nodes involved in the network service, the type of the network service, the performance of the plurality of servers for the determined time period, and the operational constraints of the plurality of servers comprises applying predetermined heuristics to the geographic locations of the plurality of participant nodes involved in the network service, the type of the network service, the performance of the plurality of servers for the determined time period, and the operational constraints of the plurality of servers.

4. The method of claim 1, wherein evaluating the geographic locations of the plurality of participant nodes involved in the network service, the type of the network service, the performance of the plurality of servers for the determined time period, and the operational constraints of the plurality of servers comprises applying the geographic locations of the plurality of participant nodes involved in the network service, the type of the network service, the performance of the plurality of servers for the determined time period, and the operational constraints of the plurality of servers to a machine learning model.

5. A service provider network comprising:
a computing node and a non-transitory computer-readable medium, the computer-readable medium having stored therein computer-readable instructions upon execution by the computing node configure the computing node to perform operations comprising:
receiving, from a first computing device associated with an organizer, a request for a network service involving a plurality of nodes comprising a plurality of computing devices including the first computing device;
determining a duration of a type of the network service;
determining, based on the duration of the type of the network service, a time period for historical latency data for a plurality of servers and the plurality of nodes, wherein the duration of the type of the network service is positively correlated to a length of the time period;
evaluating geographic locations of the plurality of nodes involved in the network service, the type of the network service, performance of the plurality of servers for the determined time period, and operational constraints of the plurality of servers, at least two of the plurality of servers being located in different geographical locations;
selecting, based on the evaluation, one or more of the plurality of servers to host the network service; and
causing the one or more of the plurality of servers to host the network service.

6. The service provider network of claim 5, wherein the computer-readable instructions upon execution configure the computing node to evaluate the geographic locations of the plurality of nodes involved in the network service, the type of the network service, the performance of the plurality of servers, and the operational constraints of the plurality of servers by applying predetermined heuristics to the geographic locations of the plurality of nodes involved in the network service, the type of the network service, the performance of the plurality of servers, and the operational constraints of the plurality of servers.

7. The service provider network of claim 5, wherein the computer-readable instructions upon execution configure the computing node to evaluate the geographic locations of the plurality of nodes involved in the network service, the type of the network service, the performance of the plurality of servers, and the operational constraints of the plurality of servers by applying the geographic locations of the plurality of nodes involved in the network service, the type of the network service, the performance of the plurality of servers, and the operational constraints of the plurality of servers to a machine learning model.

8. The service provider network of claim 5, wherein the computer-readable instructions upon execution configure the computing node to evaluate the geographic locations of the plurality of nodes involved in the network service, the type of the network service, the performance of the plurality of servers, and the operational constraints of the plurality of servers by further evaluating at least one of regulatory, legal, and policy constraints for the plurality of servers.

9. The service provider network of claim 5, wherein the computer-readable instructions upon execution further configure the service to perform operations comprising, following a predetermining time period:
   reevaluating the geographic locations of the plurality of nodes involved in the network service, the type of the network service, the performance of a plurality of servers, and the operational constraints of the plurality of servers; and
   reselecting, based on the evaluation, one or more of the plurality of servers to host the network service.

10. The service provider network of claim 5, wherein the computer-readable instructions upon execution configure the service to receive the request for the network service involving the plurality of nodes by receiving, from the organizer, at least one of the type of network service, one or more hosting regions, one or more excluded hosting regions, identifiers of the plurality of nodes, types of parameters to be evaluated, or an algorithm to select the one or more of the plurality of servers to host the network service via a graphical user interface.

11. The service provider network of claim 10, wherein the historical time period of the performance of the plurality of servers varies by type of network service.

12. The service provider network of claim 5, wherein the performance of the plurality of servers comprises at least one of latency between the plurality of servers, latency between the plurality of servers and the plurality of nodes, or latency between the plurality of servers and Internet Service Providers used by the plurality of nodes.

13. The service provider network of claim 5, wherein the type of the network service is a media conference and performance of the plurality of servers comprises at least one of performance of transmitting audio data, performance of transmitting video data, and performance of transmitting content data.

14. The service provider network of claim 5, wherein the geographic locations of the plurality of nodes are received from the request for the network service and/or received based on a characteristic of each node of the plurality of nodes.

15. The service provider network of claim 5, wherein the operation constraints of the plurality of servers comprise at least one of availability of the type of network service on one or more of the plurality of servers, availability of one or more of the plurality of servers, available capacity of the network services, redundancy, capacity of one or more of the plurality of servers, time of day, legal issues, or regulations.

16. The service provider network of claim 5, wherein the network service is at least one of a virtual machine instance, file hosting, cloud computing, a project platform, a document platform, audio conferencing, video conferencing, chatting, or gaming service.

17. A non-transitory computer-readable storage medium having stored thereon computer-readable instructions, the computer-readable instructions comprising instructions that, upon execution by one or more computer processors, at least cause:
   receiving, from a first computing device associated with an organizer, a request for a network service involving a plurality of nodes comprising a plurality of computing devices including the first computing device;
   determining a duration of a type of the network service;
   determining, based on the duration of the type of the network service, a time period for historical latency data for a plurality of servers and the plurality of nodes, wherein the duration of the type of the network service is positively correlated to a length of the time period;
   evaluating geographic locations of the plurality of nodes involved in the network service, the type of the network service, performance of the plurality of servers for the determined time period, and operational constraints of the plurality of servers, at least two of the plurality of servers being located in different geographical locations; and
   selecting, based on the evaluation, one or more of the plurality of servers to host the network service.

18. The computer-readable storage medium of claim 17, wherein the instructions, upon execution by the one or more computer processors, cause evaluating the geographic locations of the plurality of nodes involved in the network service, the type of the network service, the performance of the plurality of servers, and the operational constraints of the plurality of servers by applying predetermined heuristics to the geographic locations of the plurality of nodes involved in the network service, the type of the network service, the performance of the plurality of servers, and the operational constraints of the plurality of servers.

19. The computer-readable storage medium of claim 17, wherein the instructions, upon execution by the one or more computer processors, cause evaluating the geographic locations of the plurality of nodes involved in the network service, the type of the network service, the performance of the plurality of servers, and the operational constraints of the plurality of servers by applying the geographic locations of the plurality of nodes involved in the network service, the type of the network service, the performance of the plurality of servers, and the operational constraints of the plurality of servers to a machine learning model.

20. The computer-readable storage medium of claim 17, wherein the instructions, upon execution by the one or more computer processors, cause receiving the request for the network service involving the plurality of nodes by receiving, from the organizer, at least one of the type of network service, one or more hosting regions, one or more excluded hosting regions, identifiers of the plurality of nodes, types of parameters to be evaluated, or an algorithm to select the one or more of the plurality of servers to host the network service via a graphical user interface.

* * * * *